US009276888B2

(12) United States Patent
Razdow

(10) Patent No.: US 9,276,888 B2
(45) Date of Patent: *Mar. 1, 2016

(54) SYSTEM AND METHOD OF SUPPORTING CONSTRUCTIVE DISCOURSE ON COMPUTERS AND MOBILE DEVICES

(71) Applicant: True Engineering Technology, LLC, Cambridge, MA (US)

(72) Inventor: Allen M. Razdow, Cambridge, MA (US)

(73) Assignee: True Engineering Technology, LLC, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/525,818

(22) Filed: Oct. 28, 2014

(65) Prior Publication Data

US 2015/0180814 A1      Jun. 25, 2015

Related U.S. Application Data

(63) Continuation of application No. 13/887,785, filed on May 6, 2013, now Pat. No. 8,909,722, which is a continuation of application No. 12/069,431, filed on Feb. 8, 2008, now Pat. No. 8,438,229.

(60) Provisional application No. 60/905,400, filed on Mar. 7, 2007.

(51) Int. Cl.
*G06F 15/16* (2006.01)
*H04L 12/58* (2006.01)
*G06Q 10/10* (2012.01)

(52) U.S. Cl.
CPC .............. *H04L 51/18* (2013.01); *G06Q 10/107* (2013.01)

(58) Field of Classification Search
None
See application file for complete search history.

(56) References Cited

U.S. PATENT DOCUMENTS 5,253,362 A    10/1993  Nolan et al.
5,408,638 A     4/1995  Sagawa et al.
(Continued)

FOREIGN PATENT DOCUMENTS

WO     2009086562 A1     7/2009

OTHER PUBLICATIONS

Garrido, "Relevant Aspects of the Java Programming Language", Chapter 3 in Object-Oriented Discrete-Event Simulation with Java: A Practical Introduction, Kluwer Academic/Plenum Publishers, New York 2001, 2001, pp. 31-53.
(Continued)

*Primary Examiner* — Brian P Whipple
(74) *Attorney, Agent, or Firm* — GTC Law Group PC & Affiliates

(57) ABSTRACT

A system and method to allow a user to engage in a collaborative discourse embedded in messaging platforms such as email or instant messaging, and to visualize the structure of that discourse. The system provides the ability to create and modify tree-like structures, which can represent outlines or tables of contents employed in documents. These structures take the place of traditional documents in representing the work product of a knowledge worker. These structures are related to the discourse in that messages may refer to nodes of these structures, and hence be understood to be related. It is the interplay between the creation of a structured message-based discourse and the persistent outline-form knowledge structures that allows message-based correspondence, including the reading and writing of documents, to be performed with increased efficiency and at a higher level of integration.

5 Claims, 5 Drawing Sheets

(56) References Cited

U.S. PATENT DOCUMENTS

| | | |
|---|---|---|
| 5,432,942 A | 7/1995 | Trainer |
| 5,469,538 A | 11/1995 | Razdow |
| 5,526,475 A | 6/1996 | Razdow |
| 5,689,632 A | 11/1997 | Galy et al. |
| 5,771,392 A | 6/1998 | Razdow |
| 5,799,151 A | 8/1998 | Hoffer |
| 5,907,326 A | 5/1999 | Atkin et al. |
| 5,926,822 A | 7/1999 | Garman |
| 5,930,798 A | 7/1999 | Lawler et al. |
| 6,018,628 A | 1/2000 | Stoutamire |
| 6,202,208 B1 | 3/2001 | Holiday |
| 6,247,020 B1 | 6/2001 | Minard |
| 6,330,008 B1 | 12/2001 | Razdow et al. |
| 6,374,252 B1 | 4/2002 | Althoff et al. |
| 6,385,769 B1 | 5/2002 | Lewallen |
| 6,405,225 B1 | 6/2002 | Apfel et al. |
| 6,499,036 B1 | 12/2002 | Gurevich |
| 6,560,774 B1 | 5/2003 | Gordon et al. |
| 6,631,400 B1 | 10/2003 | DiStefano |
| 6,789,054 B1 | 9/2004 | Makhlouf |
| 6,801,938 B1 | 10/2004 | Bookman et al. |
| 6,965,857 B1 | 11/2005 | Décary |
| 7,007,069 B2 | 2/2006 | Newman et al. |
| 7,009,510 B1 | 3/2006 | Douglass et al. |
| 7,392,280 B2 | 6/2008 | Rohall et al. |
| 7,392,320 B2 | 6/2008 | Bookman et al. |
| 7,426,506 B2 | 9/2008 | Nunez |
| 7,747,240 B1 | 6/2010 | Briscoe et al. |
| 7,958,257 B2 | 6/2011 | Gershinsky et al. |
| 8,121,998 B2 | 2/2012 | Razdow et al. |
| 8,291,025 B2 | 10/2012 | Gupta et al. |
| 8,438,229 B2 | 5/2013 | Razdow |
| 8,452,842 B2 | 5/2013 | Gupta et al. |
| 8,522,168 B2 | 8/2013 | Williams |
| 8,909,722 B2 | 12/2014 | Razdow et al. |
| 2002/0013830 A1 | 1/2002 | Stuckman et al. |
| 2002/0013835 A1 | 1/2002 | Umezu et al. |
| 2002/0046201 A1 | 4/2002 | Hembry |
| 2002/0080181 A1 | 6/2002 | Razdow et al. |
| 2002/0129177 A1 | 9/2002 | McGuire et al. |
| 2003/0074651 A1 | 4/2003 | Allison |
| 2003/0105811 A1 | 6/2003 | Laborde et al. |
| 2003/0158903 A1 | 8/2003 | Rohall et al. |
| 2003/0163537 A1 | 8/2003 | Rohall et al. |
| 2003/0177170 A1 | 9/2003 | Glass |
| 2004/0078476 A1 | 4/2004 | Razdow et al. |
| 2004/0172584 A1 | 9/2004 | Jones et al. |
| 2004/0267756 A1 | 12/2004 | Bayardo, Jr. et al. |
| 2005/0021745 A1 | 1/2005 | Bookman et al. |
| 2005/0251534 A1 | 11/2005 | Nunez |
| 2006/0080369 A1 | 4/2006 | Razdow et al. |
| 2006/0159096 A1 | 7/2006 | Gershinsky et al. |
| 2006/0253566 A1* | 11/2006 | Stassinopoulos et al. .... 709/224 |
| 2007/0239802 A1 | 10/2007 | Razdow et al. |
| 2008/0005240 A1 | 1/2008 | Knighton et al. |
| 2008/0046520 A1 | 2/2008 | Jager et al. |
| 2008/0089248 A1* | 4/2008 | Ushiyama et al. ............ 370/256 |
| 2008/0222261 A1 | 9/2008 | Razdow |
| 2008/0247532 A1 | 10/2008 | Schulz |
| 2008/0270403 A1 | 10/2008 | Bookman et al. |
| 2009/0037895 A1 | 2/2009 | Le Roy |
| 2009/0150495 A1 | 6/2009 | Sun et al. |
| 2009/0150863 A1 | 6/2009 | Guo et al. |
| 2009/0171625 A1 | 7/2009 | Razdow |
| 2010/0011302 A1 | 1/2010 | Stein et al. |
| 2011/0099232 A1 | 4/2011 | Gupta et al. |
| 2012/0079044 A1 | 3/2012 | Dunn |
| 2012/0158872 A1 | 6/2012 | McNamee et al. |
| 2012/0331063 A1 | 12/2012 | Rajaram |
| 2013/0198308 A1 | 8/2013 | Yang et al. |
| 2013/0246546 A1 | 9/2013 | Razdow |

OTHER PUBLICATIONS

Lemay, et al., "Teach Yourself JAVA in 21 Days", Sanns.net Publishing, Indianapolis, Indiana, First Edition, 1996, 495 pages.
Parsons, Object Oriented Programming with C++, 2nd Edition, Continuum Books, New York, New York, 1997, 14 pages.
PCT/US09/30020, "International Search Report for International Application Serial No. PCT/US09/30020 mailed Feb. 17, 2009", 1 page.
Razdow, "Beehive Product Description: live parameters and calculations", A Beehive White Paper, Beehive Engineering Systems, Inc., Mar. 31, 2008, 15 pages.
Razdow, "Cyberspeak: architecture for a man-machine interface", A Beehive White Paper, Beehive Engineering Systems, Inc., Dec. 30, 2007, 8 pages.
Razdow, "Introducing the bscript language for engineering", A Beehive White Paper, Beehive Engineering Systems, Inc., Feb. 21, 2008, 6 pages.
Razdow, "Pervasive Engineering Knowledge Management: Speaking the engineer's language", A Beehive White Paper, Beehive Engineering Systems, Inc., Nov. 30, 2007, 16 pages.
Singh, et al., "A Metadata Catalog Service for Data Intensive Applications", Supercomputing, 2003 ACM/IEEE Conference (SC'03), Phoenix, Arizona, Nov. 15-21, 2003, 17 pages.
Zaks, "Programming the Z80", Third Revised Edition, http://www.msxarchive.nl/pub/msx/mirrors/msx2.com/zaks, 1982, 26 pages.

* cited by examiner

SYSTEM AND METHOD OF SUPPORTING CONSTRUCTIVE DISCOURSE ON COMPUTERS AND MOBILE DEVICES

CROSS REFERENCE TO RELATED APPLICATIONS

This application is a continuation of U.S. patent application Ser. No. 13/887,785, filed May 6, 2013, now U.S. Pat. No. 8,909,722; U.S. patent application Ser. No. 13/887,785 is a continuation of U.S. patent application Ser. No. 12/069,431, filed Feb. 8, 2008, now U.S. Pat. No. 8,438,229, which claims the benefit of and priority to U.S. Prov. Pat. Appl. 60/905,400, filed Mar. 7, 2007 entitled SYSTEM AND METHOD OF SUPPORTING CONSTRUCTIVE DISCOURSE ON COMPUTERS AND MOBILE DEVICES; all these applications are incorporated herein by reference in their entirety.

BACKGROUND OF THE INVENTION

The present invention relates generally to the use of personal computers (PCs) for message-based correspondence such as email and for reading and writing documents, and more specifically to a system and method of performing such message-based correspondence and reading and writing of documents with increased efficiency and at a higher level of integration.

The PC is typically used by most knowledge workers in the following ways: to read information in documents or on the web, to communicate by engaging in discourse using email or instant-messaging, and to author or edit knowledge in the form of documents or presentations. Most email programs allow users to sort messages contained in in-boxes by subject, causing messages about a given topic to appear together. An email system may also allow users to sort messages by addressee, allowing the history of interactions with a given addressee over time to be examined, and so forth. However, beyond these simple features, the user of an email system must generally read and comprehend many messages in order to form a picture of an unfolding discourse among a group of individuals on any given topic. Messages with apparently different subject headings may be related or unrelated in content, but this is not self-evident. Thus, while email in-boxes tend to be the default record of knowledge workers' interactions, decisions, and collaborations, the tools currently provided for managing them generally do a poor job of maintaining that record and making it easily understood and applied.

For this reason, an email conversation is often accompanied by the need to create a lasting representation of what was discussed in the form of a document, presentation, or other kind of persistent information. There is an interplay between email as the carrier of a conversation, and the evolution of documents related to that conversation. But, as with email, there is not much about a document that gives clues as to its meaning, beyond the content of the document itself. If a user wishes to understand what a document is about and how it relates to the email conversation surrounding it, the document, and perhaps the threads of email associated with it, usually must be read and comprehended.

Despite the speed, efficiency, searchability, and other benefits that the PC brings to the business of creating and managing files, folders, memoranda, and correspondence, little real support has heretofore been given to the management of the content and meaning of email and related documents. As a result, the office of today's knowledge worker is still much like the paper office of the 1930's.

SUMMARY OF THE INVENTION

In accordance with the present invention, a system and method is disclosed for conducting discourse over email and other messaging systems that maintains additional data and meta-data in order to provide the ability to create and modify tree or graph-like structures relating to the discourse. These structures can be used to represent taxonomies of a subject, and to categorize a given message or a string of messages. For example, messages may be broken down into the categories "Personal" and "Business", the "Personal" category may be broken down into the sub-categories "Family" and "Friends", and so on. Tree or graph-like structures can also be used to represent the structure of the subject matter of a conversation. For example, in a conversation about an upcoming meeting, the meeting itself may be broken down into the categories "Content", "Attendees", "Venue", and "Activities", and, in turn, these categories may be broken down into sub-categories to provide a finer level of detail.

By providing a rich structure representing a message-based discourse including persistent outline-form knowledge structures, the presently disclosed system and method can surpass the capabilities of traditional messaging systems such as email, and traditional knowledge-creation technology such as word-processing, to support knowledge workers with increased efficiency and at a higher level of integration.

Other features, functions, and aspects of the invention will be evident from the Detailed Description of the Invention that follows.

BRIEF DESCRIPTION OF THE DRAWINGS

The invention will be more fully understood with reference to the following Detailed Description of the Invention in conjunction with the drawings of which.

DESCRIPTION OF THE DISCLOSED SYSTEM

The disclosure of U.S. Provisional Patent Application No. 60/905,400 filed Mar. 7, 2007 entitled SYSTEM AND METHOD OF SUPPORTING CONSTRUCTIVE DISCOURSE ON COMPUTERS AND MOBILE DEVICES is incorporated herein by reference in its entirety.

Figure 1:
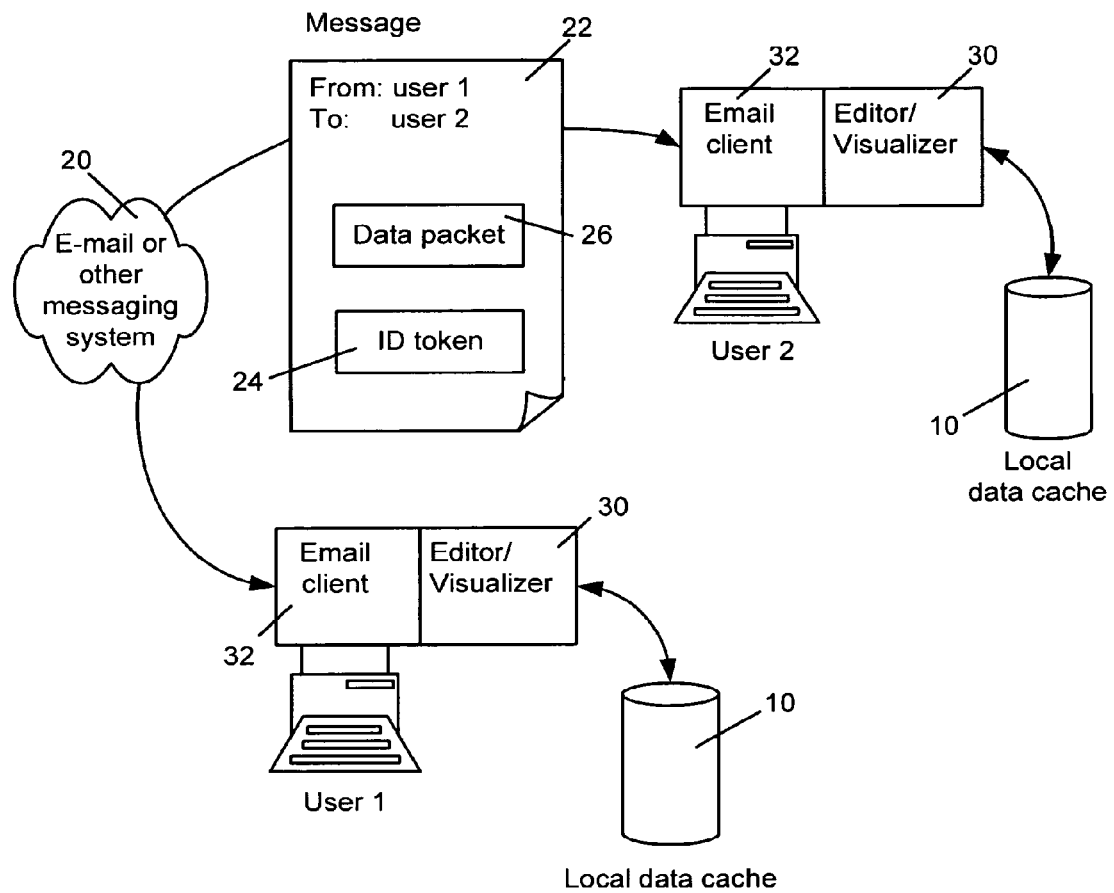
FIG. 1 is a schematic view of a system for conducting discourse over a messaging system such as email, in which messages are interpreted in the context of semantic information kept in local caches and keyed by ID tokens embedded in the messages, and in which, for collaborative scenarios, data is passed between local caches by embedding portions of such data in the host email, according to the present invention.

FIG. 1 depicts an illustrative embodiment of a system for conducting discourse over messaging systems, showing the client software and its constituent elements, and its relationship to an existing messaging system, in accordance with the present invention. FIG. 1 depicts two users of an existing host messaging system 20, however, it is understood that the disclosed system supports an arbitrary number of users. The host messaging system 20 is an e-mail system in the presently disclosed embodiment, but it could also be an instant messaging system or any other suitable type of messaging system. In an alternative embodiment, a special-purpose messaging system could be constructed to act as the host messaging system 20. Also shown FIG. 1 is a host message 22, representing, for example, an e-mail message passing from user 1 to user 2. Users employ a messaging client 32 associated with the host messaging system 20 to create, send, receive, and examine messages. The disclosed system adds to, or associates with, the messaging client 32 a visual data editor 30 for the purpose of creating, editing, and visualizing contextual information for the organization of messages, and for representing structured information to be included in the content of messages. The disclosed system can embed two types of information in a host message 22. The first type is an ID token 24, which identifies the message as being associated with a particular context or aspect of the data in the user's local data cache 10. The second type is a data packet 26, containing a subset of the data in the local data cache 10. This subset of the data cache is transmitted in cases when the user wishes to share a part of his or her data with recipients of the message.

Figure 2:
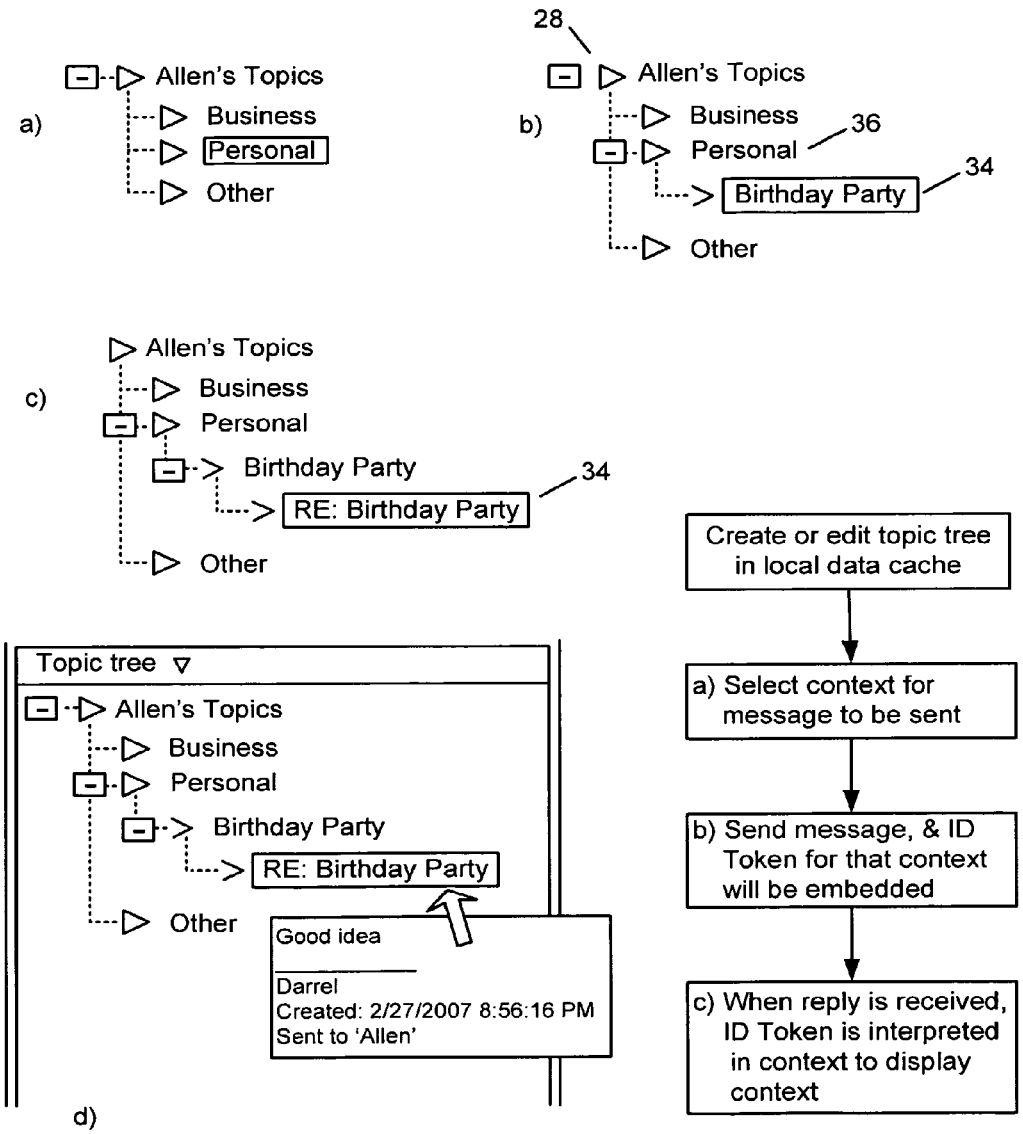
FIG. 2 is a representation of the steps involved in associating a message-based conversation with a topic tree within the system of FIG. 1.

One usage of the presently disclosed system is to allow a user to organize his or her email conversations by topic, as illustrated in FIG. 2. Following the flow diagram of FIG. 2, the first step involves the user employing the visual data editor 30 to create data in the form of a hierarchical taxonomy of topics, referred to herein as a topic tree 28. This data is stored in a local data cache 10 (see FIG. 1) associated with each user. When a user wishes to send a message, he or she first selects a topic node 36 (see FIG. 2) within this data (see step (a) of the flow diagram of FIG. 2). When the message is sent, it is marked with an ID token 24 representative of that context or topic within the topic tree 28. In an illustrative embodiment, this token is a General Universal Identifier or GUID, and is appended to the body of the email message. The local data cache 10 (see FIG. 1) indexes each topic in the topic tree 28 (see FIG. 2) by the ID token 24, such that an ID token can be used to retrieve the associated context or topic in the local data cache 10. When the message is sent, it is added to the topic tree 28 as a comment node 34 (see step (b) of the flow diagram of FIG. 2) underneath the topic that the message was marked with. When a recipient of the message, who is not a user of the presently disclosed system, sends a reply, including the text of the original message, the ID token 24 is also included. Upon arrival, the disclosed system acts to retrieve the ID token 24 from the message to allow it to add a comment node 34 to the topic tree 28 in the appropriate context (see step (c) of the flow diagram of FIG. 2). Thus, this illustrative mode of operation allows the user to maintain a taxonomy of discussion topics for the host messaging system 20, and to have messages related to given topics be presented accordingly in the topic tree 28, as displayed in the visual data editor 30. In an illustrative embodiment, it is possible to view the text of a message associated with a comment node 34 by clicking or hovering a mouse or other pointing device over or near the comment node 34, as shown with reference to letter (d) in FIG. 2.

Figure 3:
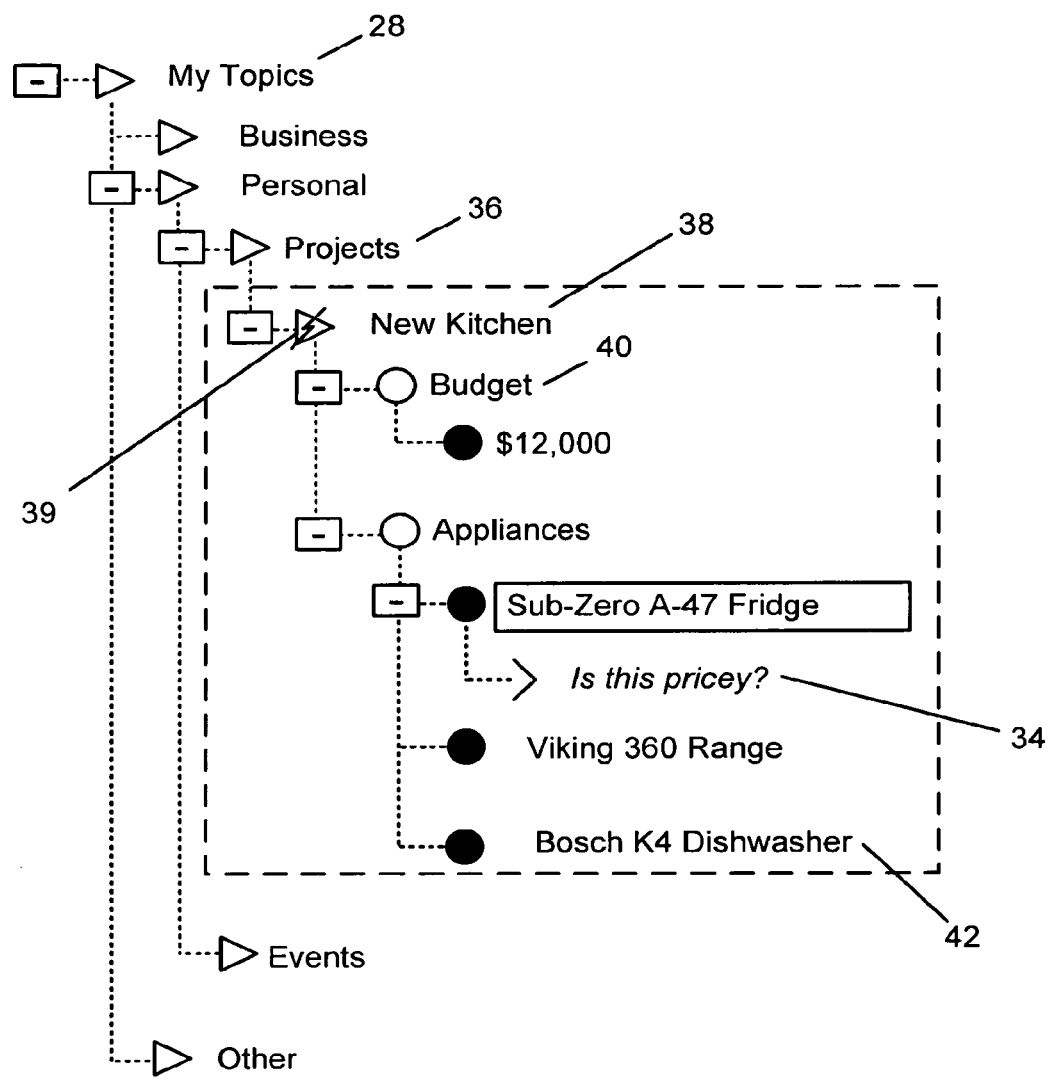
FIG. 3 is an example of a topic tree data structure, as represented in a visual data editor included in the system of FIG. 1, showing the types of information expressible therein.

FIG. 3 depicts an illustrative embodiment of the topic tree 28 and its components. The graphical representation of FIG. 3 shows the hierarchical decomposition of a topic node 36 ("Projects") into its children ("New Kitchen"), each being itself a topic node 36. A property node 40 ("Budget", "Appliances") serves to represent attributes of a topic independent of its decomposition. A property node 40 has one or more values, each represented by a value node 42 (for example, "Bosch K4 Dishwasher"). A shared subtree 38 is indicated by a special icon 39 at its apex, and is a subtree which the presently disclosed system treats differently from the rest of the topic tree 28. The shared subtree 38 is delineated by a dashed box in FIG. 3 for purposes of illustration.

Figure 4:
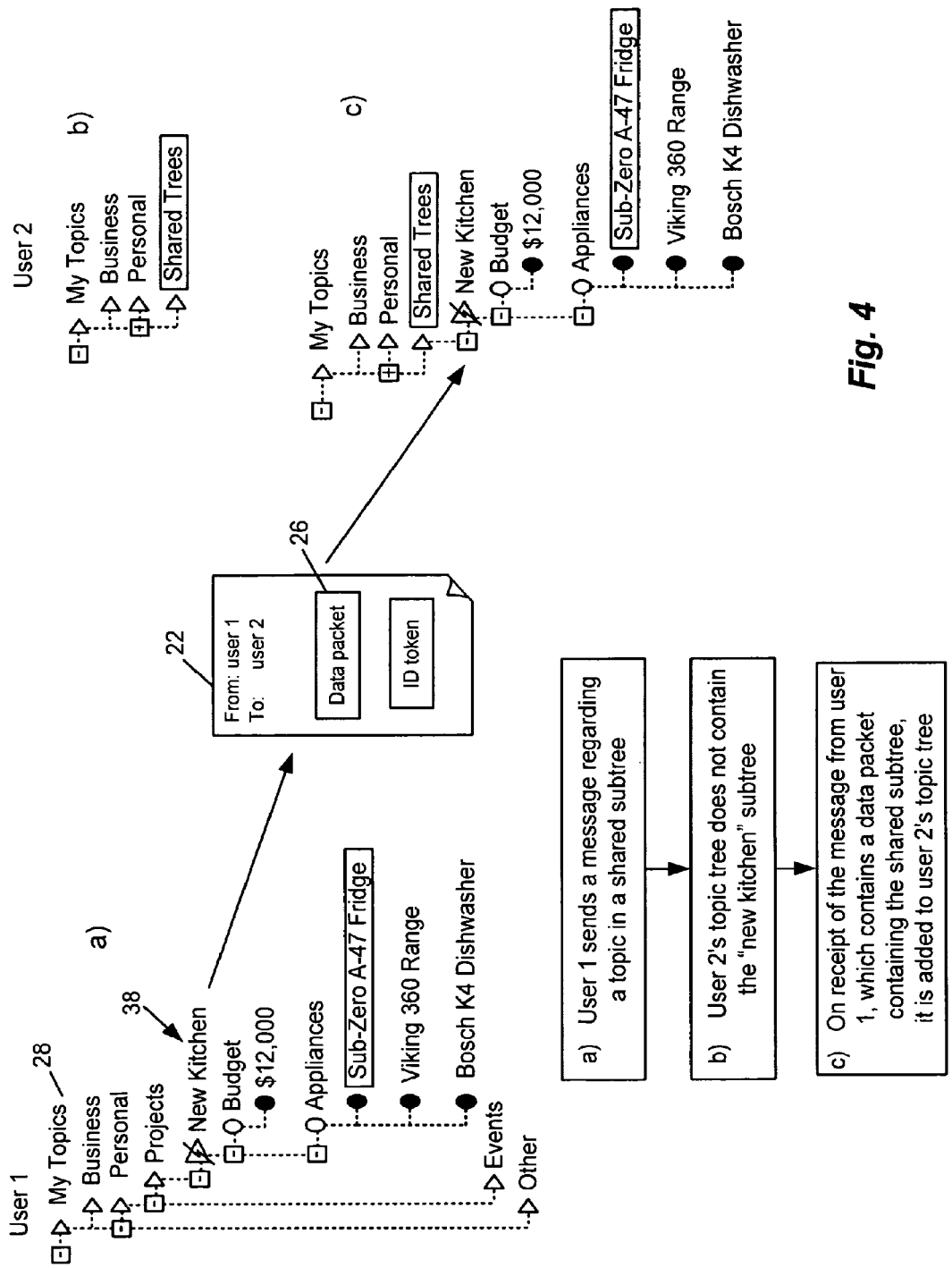
FIG. 4 is a flow diagram and illustration of a use of the system of FIG. 1 to transmit a message regarding a part of a shared topic tree, such that the shared topic tree becomes embedded in the host message as a data packet to be decoded by the recipient or recipients of the message.

Another usage of the presently disclosed system is depicted in FIG. 4. With reference to step (a) of the flow diagram of FIG. 4, user 1 creates a shared subtree 38 in the topic tree 28 stored in his or her local data cache 10 (see FIG. 1). Further, user 1 selects a node in that subtree 38 (for example, "Sub-Zero A-47 Fridge"; see FIG. 4), and sends a message to user 2. Because the selected node is in a shared subtree 38, the presently disclosed system embeds a data packet 26 representing the shared subtree 38 into the host message 22. Upon receipt by user 2, who is also a user of the disclosed system, the data packet 26 is decoded and inserted into an appropriate location in user 2's topic tree 28. User 2 can now edit and/or augment his or her copy of the shared subtree 38, and subsequently send it back to user 1, and so forth. In this way, FIG. 4 illustrates a process in which users may share and collaborate in the construction of the shared subtree 38.

Figure 5:
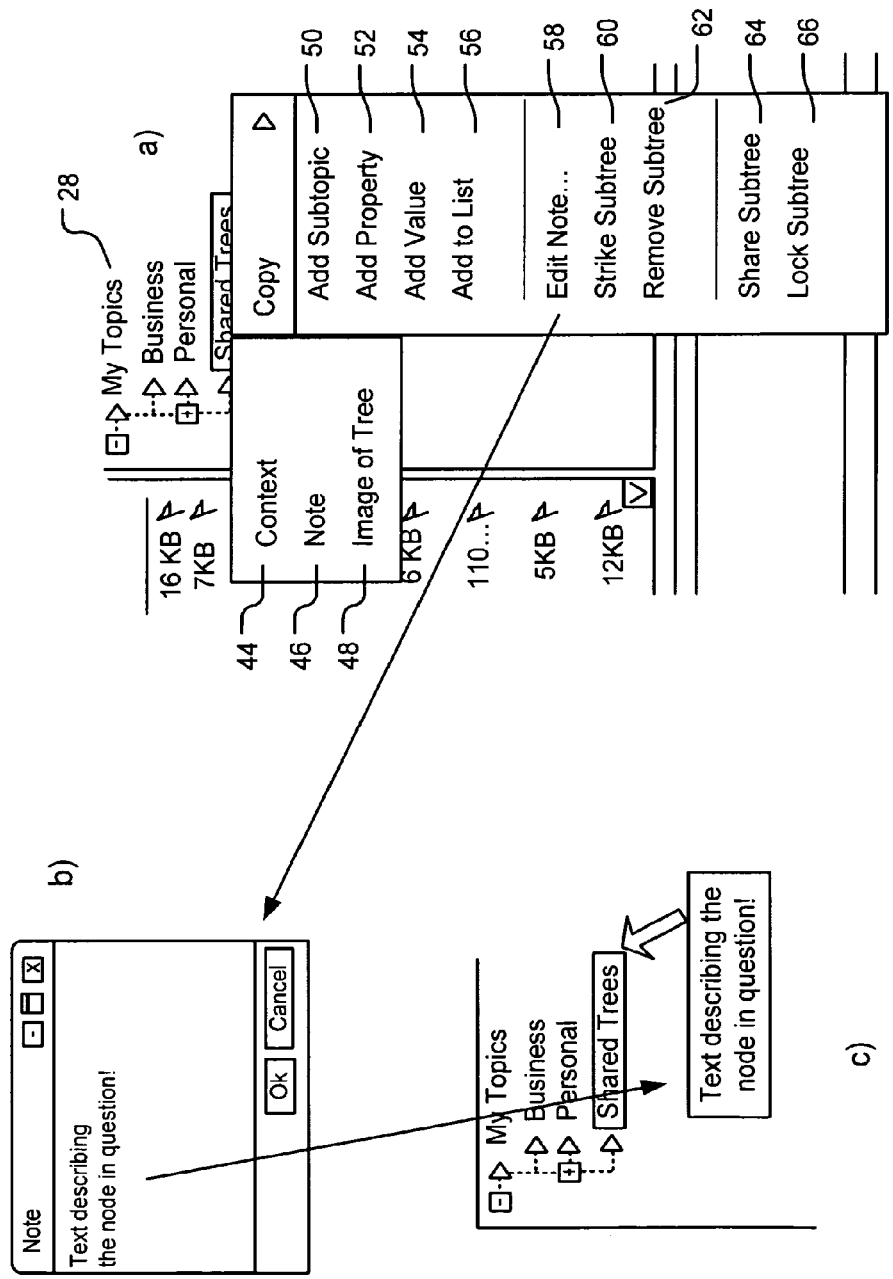
FIG. 5 is an illustration of commands and dialogs associated with the visual data editor of FIG. 1.

FIG. 5 depicts illustrative commands and dialogs associated with the visual data editor 30 (see FIG. 1). Specifically, FIG. 5 depicts the context menu (see reference letter (a) in FIG. 5) of the visual data editor 30. In an illustrative embodiment, the context menu is opened by a right-mouse-click on a node selected in the topic tree 28. The effect of each item in the menu is as follows.

The copy context command 44 loads the clipboard with an automatically constructed sentence or sentences describing the context of the selected node. For example, for the selected node ("Shared Trees"), the presently disclosed system generates the sentence "Text describing the node in question!"

The copy note command 46 (see FIG. 5) copies the text annotation of the selected node to the clipboard (see also the discussion below relating to the edit note command 58). The copy image of tree command 48 (see FIG. 5) copies a bitmap rendering of the current topic tree 28 to the clipboard.

The add subtopic command 50, add property command 52, and add value command 54 (see FIG. 5) each create a new child node underneath the selected node. These commands are enabled and disabled according to the type of node selected. For example, a value node 42 (e.g., "Bosch K4 Dishwasher"; see FIG. 3) can only be the child of a property node 40 (e.g., "Appliances"; see FIG. 3).

The add to list command 56 (see FIG. 5) similarly adds a sibling node to the child node selected. The type of node added is of the same kind as the selected node. For example, a list of subtopics can be created by first issuing the add subtopic command 50, followed by repeated application of the add to list command 56.

The edit note command 58 is illustrated in detail in FIG. 5 (see reference letters (a)-(c) in FIG. 5). With reference to letter (b) in FIG. 5, the dialog is shown appearing for the purpose of entering or editing text associated with the selected node ("Shared Trees"). With reference to letter (c) in FIG. 5, the mouse pointer is shown hovering over or near the selected node, thereby displaying the associated note text ("Text describing the node in question!").

The strike subtree command 60 and remove subtree 62 command (see FIG. 5) each act to delete the subtree, beginning with the selected node. The remove subtree 62 command does so immediately, whereas the strike subtree command 60 marks the nodes of the selected subtree as potentially deleted. At a later time, for example, after the recipients of the shared subtree 38 containing the stricken nodes have reviewed them, the nodes are actually deleted.

Like the strike subtree command 60, the share subtree command 64 and lock and unlock subtree command 66 (see FIG. 5) change the state of the selected subtree. The share subtree command 64 serves to mark the subtree as shared, changing the behavior of the system to act according to the usage described with reference to FIG. 4. The lock and unlock subtree command 66 renders the selected subtree non-editable until the same identified user who locked the subtree issues the corresponding command to unlock the subtree.

Having described the above illustrative embodiments, other alternative embodiments or variations may be made. For example, it was described that the disclosed system adds to, or associates with, the messaging client 32 a visual data editor 30 (see FIG. 1) for the purpose of creating, editing, and visualizing contextual information for the organization of messages, and for representing structured information to be included in the content of messages. It should be understood, however, that the disclosed system is operative to create, edit, and visualize contextual information for the organization of appointments, tasks, or any other suitable items in place of, or in addition to, messages. It should also be understood that users may employ a desktop device such as a personal computer (PC), a mobile device such as a mobile telephone, a Blackberry®. mobile device, a Treo™ mobile device, an iPhone™ mobile device, or a personal digital assistant (PDA), or any other suitable desktop or mobile device associated with the host system 20 (see FIG. 1) to create, send, receive, and/or examine messages, appointments, tasks, etc. In addition, the entire user interface, or at least a portion of the user interface, of such desktop or mobile devices may comprise a hierarchical taxonomy of topics, as embodied in the disclosed topic tree 28 (see FIG. 3).

It will be appreciated by those of ordinary skill in the art that further modifications to and variations of the above-described system and method of supporting constructive discourse on computers and mobile devices may be made without departing from the inventive concepts disclosed herein. Accordingly, the invention should not be viewed as limited except as by the scope and spirit of the appended claims.

What is claimed is:

1. A method of performing message-based discourse on computer and mobile devices, comprising the steps of:
  receiving, at a first user device, from a first user, data defining a hierarchy of information comprising a plurality of nodes;
  generating, at a first user device, a hierarchy of information using the data defining a hierarchy of information, said hierarchy of information being represented by a tree having the plurality of nodes;
  receiving a selection, at said first user device, from the first user, of a respective one of the plurality of nodes of the tree, each node corresponding to a respective topic within said hierarchy of information, each respective topic being indexed by a specified identifier;
  generating, at said first user device, a first message, including embedding, within said first message, at least one first data packet containing data representing said hierarchy of information, and appending, to said first message, said specified identifier indexing the respective topic; and
  sending said first message from said first user device to said second user device for decoding at said second user device, said first data packet within said first message for generating a representation of said hierarchy of information at said second user device, the representation of said hierarchy of information including an indication of the respective topic indexed by said specified identifier.

2. The method of claim 1 further including receiving at said first user device a comment from said second user device, said comment relating to the respective topic indexed by said specified identifier, said comment being represented, within said hierarchy of information, by a sub-node of the node corresponding to the respective topic.

3. The method of claim 2 including:
  receiving at said first user device a second message from said second user device, said second message, including at least one second data packet embedded within said second message containing data representing said hierarchy of information including the sub-node representing said comment appended to said second message, said specified identifier indexing the respective topic;
  decoding, at said first user device, said second data packet within said second message; and
  appending the sub-node representing said comment to the tree representing said hierarchy of information generated at said first user device, the sub-node being appended to the node corresponding to the respective topic indexed by said specified identifier.

4. A method comprising:
  generating, at a first user device, a first hierarchical taxonomy comprising a first plurality of topics, the hierarchy being represented by a first tree having a first plurality of nodes, each node corresponding to a respective one of the first plurality of topics and indexed by a respective identifier;
  receiving a selection, at said first user device, from a first user, of a respective one of the first plurality of nodes of the first tree;
  generating, at the first user device, a first message, the first message comprising a subtree, the subtree comprising the selected one of the first plurality of nodes and all nodes within the first plurality of nodes located hierarchically below the selected one of the first plurality of nodes in the first tree, wherein the nodes in the subtree are hierarchically arranged as in the first tree; and
  sending, over a network, the first message to a second user for inserting, at the second user device, the subtree into a second tree, wherein the second tree represents a second hierarchical taxonomy comprising a second plurality of topics, the second tree comprising a second plurality of nodes, each node corresponding to a respective one of the second plurality of topics and indexed by a respective identifier.

5. The method of claim 4 further comprising:
  updating a node in the first tree at the first user device, corresponding to the selected node in the updated tree at the second user device, wherein the node in the first tree at the first user device is updated to reflect the modifications to the selected node within the updated subtree.

\* \* \* \* \*